(12) United States Patent
Wiedemann et al.

(10) Patent No.: US 9,546,565 B2
(45) Date of Patent: Jan. 17, 2017

(54) FLUID INTAKE AND SYSTEM FOR ROTARY MACHINES

(71) Applicant: ROLLS-ROYCE PLC, London (GB)

(72) Inventors: Nikolas Wiedemann, Derby (GB); Yi Wang, Nottingham (GB)

(73) Assignee: ROLLS-ROYCE plc, London (GB)

( * ) Notice: Subject to any disclaimer, the term of this patent is extended or adjusted under 35 U.S.C. 154(b) by 802 days.

(21) Appl. No.: 13/926,458

(22) Filed: Jun. 25, 2013

(65) Prior Publication Data

US 2014/0010635 A1 Jan. 9, 2014

(30) Foreign Application Priority Data

Jul. 6, 2012 (GB) .................................. 1212072.1

(51) Int. Cl.
*F01D 25/00* (2006.01)
*F01D 25/12* (2006.01)
*F02C 7/18* (2006.01)

(52) U.S. Cl.
CPC .............. *F01D 25/00* (2013.01); *F01D 25/12* (2013.01); *F02C 7/185* (2013.01); *Y02T 50/675* (2013.01)

(58) Field of Classification Search
CPC .......... F01D 25/00; F01D 25/12; F01D 25/08; F01D 5/084; F01D 5/08; F01D 5/081; F01D 5/082; F02C 7/12; F02C 7/125; F02C 7/16; F02C 7/18; F02C 7/185; Y02T 50/675; B64D 33/08; B64D 2033/024; B64D 2033/0293
See application file for complete search history.

(56) References Cited

U.S. PATENT DOCUMENTS

| | | | | |
|---|---|---|---|---|
| 2,352,790 A | * | 7/1944 | Jordan | B64D 33/08 244/130 |
| 2,586,054 A | * | 2/1952 | Julius | B64C 11/48 244/60 |
| 2,719,592 A | * | 10/1955 | Blanchard, Jr. | B64C 11/14 416/129 |
| 4,171,183 A | * | 10/1979 | Cornell | B64C 11/00 416/223 R |
| 4,563,129 A | * | 1/1986 | Pagluica | B64C 11/48 416/129 |

(Continued)

FOREIGN PATENT DOCUMENTS

| | | |
|---|---|---|
| GB | 927718 | 12/1958 |
| GB | 2 180 009 A | 3/1987 |

OTHER PUBLICATIONS

Oct. 22, 2012 British Search Report issued in British Application No. GB1212072.1.

*Primary Examiner* — Gregory Anderson
*Assistant Examiner* — Wayne A Lambert
(74) *Attorney, Agent, or Firm* — Oliff PLC (57) ABSTRACT

A fluid supply system for a rotary machine, the system includes a rotor assembly with an array of blades arranged to be driven about a primary axis to provide propulsive thrust in use, each blade having a longitudinal axis, the rotor assembly including a casing structure, wherein the casing structure is rotatable in unison with the blades about the primary axis; and a directional fluid intake, the intake being rotatably mounted at an outer surface of the casing structure about a second axis which is angularly offset from the primary axis and which is offset from and independent of the longitudinal axis of the blade.

20 Claims, 4 Drawing Sheets

(56) References Cited

U.S. PATENT DOCUMENTS

| | | | | |
|---|---|---|---|---|
| 4,607,657 | A * | 8/1986 | Hirschkron | B64D 33/02 137/15.1 |
| 4,999,994 | A * | 3/1991 | Rud | F02C 7/047 416/170 R |
| 5,112,191 | A * | 5/1992 | Strock | B64C 11/06 416/129 |
| 5,269,135 | A * | 12/1993 | Vermejan | F02C 7/04 60/226.1 |
| 2005/0268593 | A1 * | 12/2005 | Hagshenas | B64D 33/08 60/39.08 |
| 2009/0202357 | A1 * | 8/2009 | Stern | F01D 1/26 416/97 R |
| 2011/0083417 | A1 * | 4/2011 | Keating | F01D 5/14 60/226.1 |
| 2011/0268563 | A1 * | 11/2011 | Stretton | F01D 25/12 415/179 |

* cited by examiner

FLUID INTAKE AND SYSTEM FOR ROTARY MACHINES

FIELD OF INVENTION

The present invention relates to fluid intakes and/or fluid supply systems for rotary machines and typically, although not exclusively, to intakes for a coolant, such as air.

BACKGROUND

In rotary machines, heat is generated from rotating components, such as bearings and gears, as a result of friction, windage and oil churning etc. Particularly within combustion engines an oil system is intended to deliver oil at an adequate flow rate and temperature to lubricate and cool components. The heated oil is collected and cooled via a suitable cooling system so as to establish a continuous heating and cooling cycle to maintain oil temperature within desired temperature limits. Such an oil system typically forms part of a larger engine heat management system.

A fuel/oil heat exchanger may be used to cool hot oil, whereby the engine fuel provides a primary coolant. Additional cooling may be provided via an air/oil heat exchanger if the fuel heat dissipation capacity is insufficient to adequately maintain the desired oil and fuel operating temperatures.

It is known to use air taken from a low pressure compressor stage as a source of cooling air, whereby air at a relatively low temperature is driven through the heat exchanger. However the pressure rise imparted by a low pressure compressor limits the cooling capacity of such an arrangement. Also there is uncertainty or inconsistency of the air supply at lower engine power/speed conditions. Whilst downstream compression stages of a compressor arrangement can provide higher pressure air, the work done by the compressor increases the air temperature at those stages, such that it becomes less suitable or else entirely unusable as a coolant supply. Accordingly the choice of a suitable compressor stage as a coolant supply is limited, as is the cooling capacity of air supplied thereby.

Also, some bleed air is typically taken from the compressor stages as part of the air system and fed into bearing chambers of a gas turbine engine in order to ensure correct bearing chamber sealing. The hotter compressor air causes an increased oil temperature, thereby increasing the demands on oil heat exchangers.

An alternative cooling air source for aircraft gas turbine engines is ram air due to the forward motion of the aircraft/engine. Ambient air in a ram air intake, as opposed to air on which work has been done by a compressor, can provide a cooler air source such a comparative cooling capacity to that provided by air from a compressor stage can be achieved by ram air that a lower coolant flow rate. However ram air intake is subject to the relative movement in a direction of travel between the engine and ambient air. Accordingly, particularly at low levels of operation (e.g. at low engine/aircraft speeds), the ram air pressure is typically insufficient to drive an adequate flow of cooling air through the relevant portions of the cooling system.

It is known to provide an additional cooling arrangement in conjunction with a ram air intake, such as a so-called ejector system, in which high pressure air is taken from a compressor stage to drive coolant through the system. However such arrangements represent a loss of efficiency for the engine as a whole. The weight and cost associated with the additional pipework and consumption of high pressure air as ejector driving flow are specific points of concern.

The cooling air needed for the whole engine oil and heat management system of a Gas Turbine Engine (GTE) could be as high as 10% or more of the total core engine airflow. In light of the ongoing trend towards improved gas turbine engine efficiency, particularly in the aerospace industry, such a coolant flow is considered to have a significant impact on the engine performance.

It is an aim of the present invention to provide an improved coolant system which can solve or at least mitigate problems associated with the prior art, for example by offering greater cooling efficiency and/or reduced complexity.

STATEMENTS OF INVENTION

According to the present invention, there is provided a coolant supply system for a rotary machine, the system comprising: a rotor assembly comprising an array of blades arranged to be driven about a primary axis in use, the rotor assembly comprising a casing structure from which the blades depend, wherein the casing structure is rotatable in unison with the blades about the primary axis; the system further comprising a directional coolant intake, said intake being rotatably mounted relative to the casing structure about a second axis.

The second axis may be angularly offset from the first axis. The second axis may be offset from the primary axis by greater than 45° or 60° or 80°. The second axis may be a substantially radial or orthogonal axis with respect to the primary axis. Alternatively the second axis may be offset from the first axis, for example if the second axis is generally parallel therewith.

The coolant intake may comprise a ram fluid intake, such as a ram air intake. The coolant may comprise ambient air.

The invention may allow either or both of a forward or rotating motion of the rotor assembly to contribute to pressure rise at the intake for driving a coolant supply for oil/component cooling or sealing. The coolant supply system may comprise part of a gearbox cooling arrangement.

The intake may comprise angular/rotational adjustment means for ensuring that the intake faces a direction of motion relative to the ambient air. The relative motion may comprise forward and rotational components.

The rotary machine may comprise an engine, such as a gas turbine engine. The rotary machine may comprise an open-rotor gas turbine engine.

The casing structure may comprise a gas-washed surface such as an outwardly or inwardly facing circumferential surface, which may be located about the primary axis. The casing structure may comprise a nacelle. The outer surface of the casing structure may rotate in unison with the blades. The intake may comprise an opening in the outer surface. The second axis may be substantially perpendicular to the outer surface.

Certain embodiments of the invention may use a combination of the nacelle rotation and forward engine speed to drive a cooling/sealing airflow towards the engine gearbox surfaces, thereby improving the heat transfer and reducing the requirement to otherwise drive cooling air through the cooling system.

The intake may be rotatable between a first orientation in which the intake is substantially aligned with the direction of rotation of the rotor assembly about the first axis and a second orientation which is angularly offset therefrom about the second axis. The second orientation may be spaced from the first direction by between 20° and 60°. A maximum degree of rotation of the intake about the second axis may be between 40 and 50°, such as for example approximately 45°. However in other embodiments, it is possible that the maximum degree of rotation may be as much as 90°.

The angular orientation of the intake about the second axis may vary according to one or more operational parameter of the machine, such as for example, one or more current, typically transient, operational parameters. The operational parameter(s) may comprise the rotational speed of the rotor assembly and/or the speed of movement (or relative movement) of the machine in a direction of travel. The direction of travel may be aligned or substantially aligned with the first axis. The direction of travel may be defined as a direction of linear relative movement (or translation) between the machine and ambient air.

The intake may comprise an actuator, such as a vane or else an actuator mechanism for turning the vane in response to an operational parameter, such as a direction of motion.

The angular orientation of the intake may vary passively in response to the one or more operational parameter, such as for example, by way of the shape of the intake. Additionally or alternatively, an actuation mechanism may be provided to actively alter the angular orientation of the intake about the second axis. The actuation mechanism may actuate the intake in response to control signals from a controller. The actuation mechanism may comprise a drive for rotation of the intake about the second axis.

The intake may comprise an opening in the casing structure. The intake may comprise a raised formation with respect to a surface of the casing structure. The intake may comprise one or more walls defining a mouth. The intake may comprise a scoop or cowl or hood or conduit which may be open at one end and may be referred to as an "offtake". An opposing end or side of the intake may be closed. The intake may be pivotable about the second axis which may be at a location part-way along the length of the intake formation between its open and closed ends. A vane or other alignment formation may be provided such that the intake opening is aligned with the direction of the relative movement between the rotor assembly and the ambient air.

The rotor assembly may comprise a propulsive rotor assembly. The rotor assembly may comprise a propeller assembly.

According to a second aspect of the invention, there is provided an air intake for a rotary machine, the machine comprising a rotor assembly comprising an array of blades arranged to be driven about a primary axis in use, the rotor assembly comprising a casing structure from which the blades depend, wherein the casing structure is rotatable in unison with the blades about the primary axis, wherein the intake comprises: a hood member movably mounted relative to the casing structure, the hood member having a mouth for flow of air into the casing structure; and, adjustment means for the hood member to ensure that the mouth faces the direction of relative movement between the casing structure and the ambient air in use.

The hood member may be rotatably mounted relative to the casing structure about a second axis. The second axis may be angularly offset from the first axis.

Any of the features described above in relation to the first aspect may be applied to the second aspect.

DESCRIPTION OF DRAWINGS

Workable embodiments of the invention are described in further detail below with reference to the accompanying drawings, of which.

DESCRIPTION

The so-called "open rotor" gas turbine engine concept has been developed over recent years in order to address stringent modern aero engine performance targets, in particular focusing on improving SFC (specific fuel consumption). However the cooling demands for maintaining oil and fuel temperatures in an open rotor engine are typically greater than a conventional ducted GTE due to the additional heat generation from the reduction gearbox for the open rotors. Whilst the present invention is particularly suited to an open rotor GTE, it is not limited thereto and may be applied to other rotor assemblies in which there is a need for a source of pressurised air for cooling or sealing purposes within the rotor.

Figure 1:
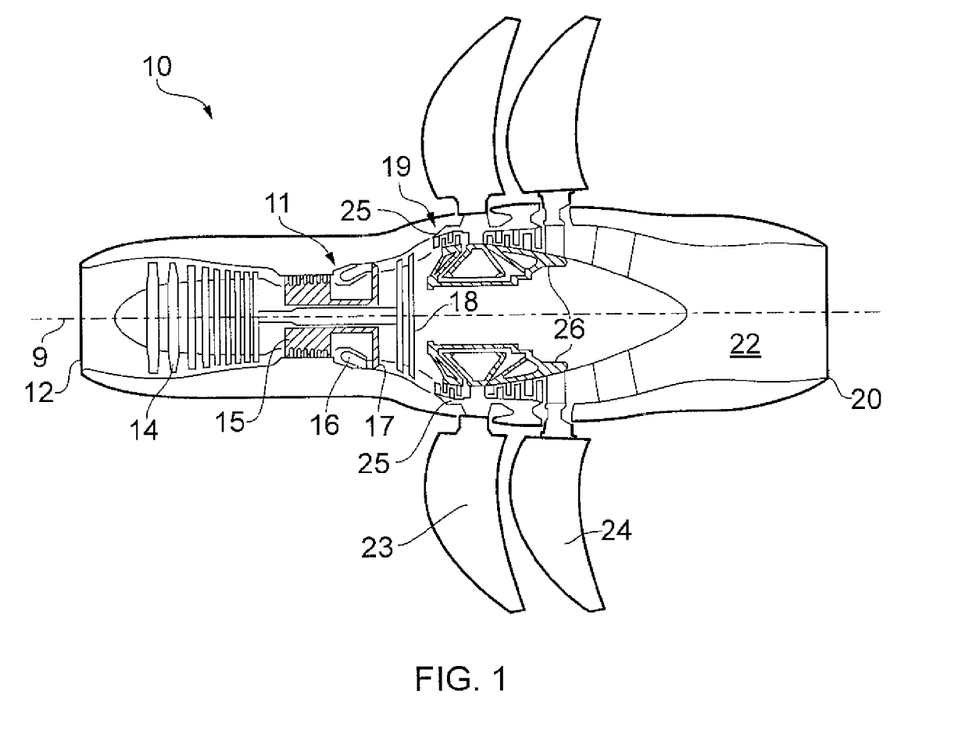
FIG. 1 shows a longitudinal section through a gas turbine engine to which the present invention may be applied.

Referring to FIG. 1, a twin-spooled, contra-rotating propeller gas turbine engine is generally indicated at 10 and has a principal and rotational axis 9. The engine 10 comprises a core engine 11 having, in axial flow series, an engine air intake 12, an low pressure compressor 14 (LPC), a high-pressure compressor 15 (HPC), combustion equipment 16, a high-pressure turbine 17 (HPT), low pressure turbine 18 (LPT), a free power turbine 19 (FPT) and a core exhaust nozzle 20. A nacelle generally surrounds the core engine 11 and defines the intake 12 and nozzle 20 and a core exhaust duct 22. The engine 10 also comprises two contra-rotating propellers 23, 24 attached to and driven by the free power turbine 19, which comprises contra-rotating blade arrays 25, 26.

The gas turbine engine 10 works in a conventional manner so that air entering the intake 12 is accelerated and compressed by the LPC 14 and directed into the HPC 15 where further compression takes place. The compressed air exhausted from the HPC 15 is directed into the combustion equipment 16 where it is mixed with fuel and the mixture combusted. The resultant hot combustion products then expand through, and thereby drive the high, low-pressure and free power turbines 17, 18, 19 before being exhausted through the nozzle 20 to provide some propulsive thrust. The high, low-pressure and free power turbines 17, 18, 19 respectively drive the high and intermediate pressure compressors 15, 14 and the propellers 23, 24 by suitable interconnecting shafts. The propellers 23, 24 normally provide the majority of the propulsive thrust.

The propeller blades each have a Longitudinal axis and adjustable pitch to alter the thrust generated and as such are rotatable about the longitudinal axis or blade pitch axis. The pitch of each blade is typically achieved with a pitch rotation mechanism located within the nacelle (not shown), as is well known in the art.

An alternative arrangement could also consist of a single turbine stage and using a gearbox to split the torque between propeller arrays 25, 26.

The above GTE may be referred to as a "pusher" configuration in that the propellers are mounted to the rear of the turbines.

In an alternative open-rotor configuration, often referred to as a "puller" configuration, the propellers are mounted towards the front (in the direction of flow/travel) of the engine. In any configuration, there may be provided a single or a plurality of propeller stages. In order to drive the propellers at a rotational speed which offers greatest efficiency a reduction gearbox is typically provided. This allows the propellers to rotate more slowly than the LPT, which typically rotates at a greater speed to achieve greater efficiency.

Figure 2:
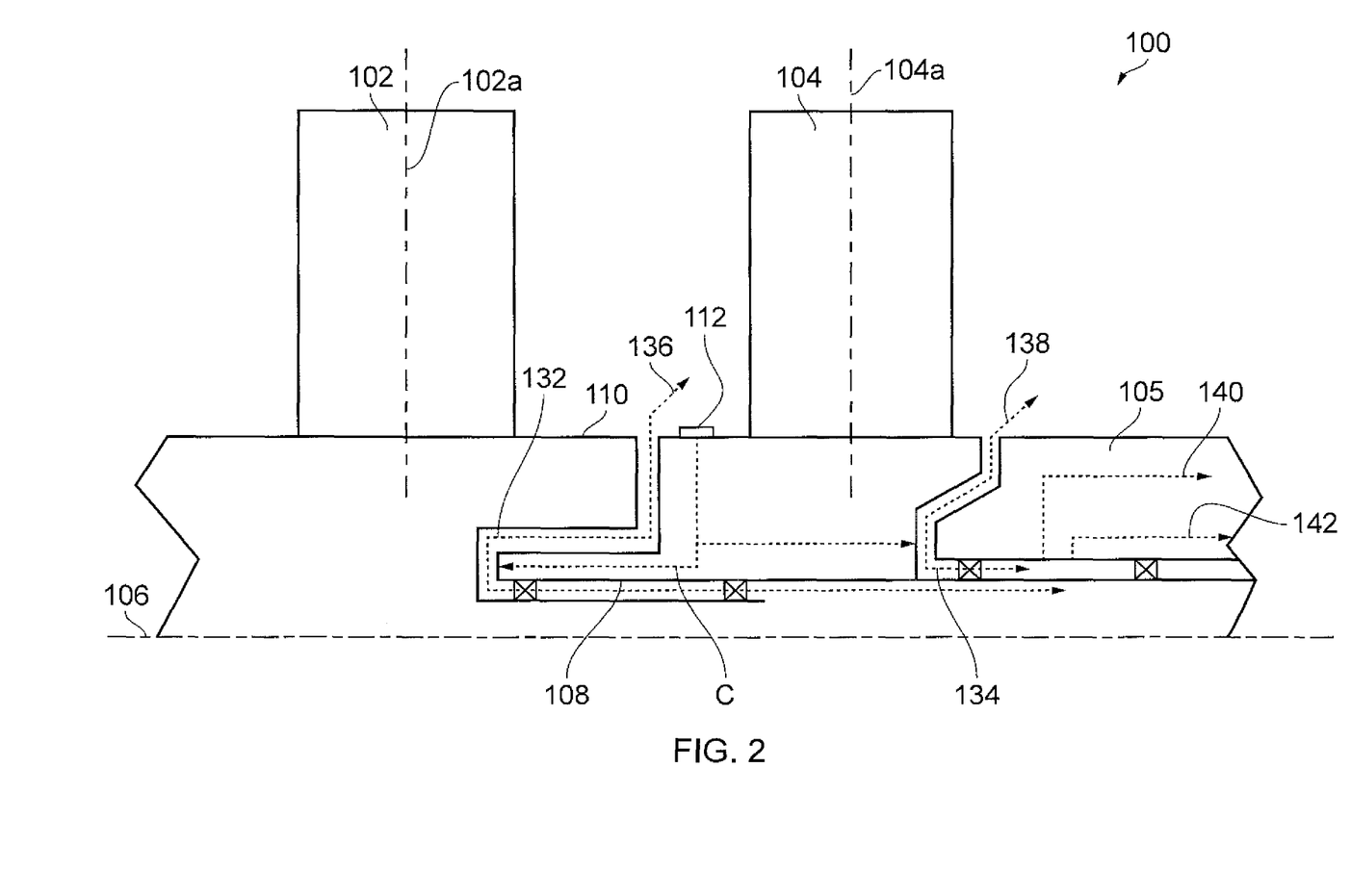
FIG. 2 shows a half longitudinal section through a rotor assembly coolant supply system according to an example of the invention.

The present invention is particularly suited to use with oil heat management systems for turboprop engines with a front mounted reduction gearbox (puller), as shown schematically in FIG. 2. The gearbox in such an arrangement is located at the front of the engine. This invention proposes an arrangement with which the oil cooling/bearing chambers sealing can be achieved within the gearbox nacelle by making use of both the conventional ram pressure from the forward aircraft speed and also the rotating dynamic pressure of air due to the rotating nacelle to drive airflow through to provide oil cooling. Such an arrangement may however be provided in other configurations in which a rotating casing/nacelle portion is provided, for example, to support the rotating blade array, and where there is a need to direct air under pressure to an internal portion of the machine.

As labelled in FIG. 2, the rotor assembly 100 comprises front 102 and rear 104, typically contra-rotating, propeller blade arrays mounted about the common axis 106. The gearbox assembly has an outer wall 108 housed within nacelle 110 and mounted such that the wall 108 of the gearbox and the surrounding nacelle 110 both rotate to support the rotating blades 102;104.

The gearbox outer wall 108 is spaced, typically in a radial direction, from the inner wall/surface of the nacelle 110. In this regard the gearbox may be designed to have a small radial dimension to minimise weight, whereas the rotating nacelle may be required to have a larger diameter (thereby being spaced from the gearbox wall 108) in order to meet its aerodynamic requirements.

An open-sided or open-ended intake formation 112 in the form of a scoop is provided on the outer peripheral wall of the nacelle 110, a short distance from the root of the blade 104. This intake is separate from the engine air intake 12 shown in FIG. 1. In this example coolant air intake formation 112 is provided at a location between the adjacent blade arrays or stages 102 and 104. However the intake could alternatively be provided upstream of the front blade array 102 or downstream of the rear blade array 104 as required. The scoop is located separately and independently from the blade and the longitudinal axis thereof.

The system may comprise only one such intake 112 or else may comprise a plurality of intakes, which may be spaced, for example circumferentially, about the nacelle. An array of intakes may be provided, which may be equally spaced about the primary axis 106. The, or each intake, is generally shaped to turn incoming air towards the primary axis 106, for example in a substantially radial direction.

Figure 3:
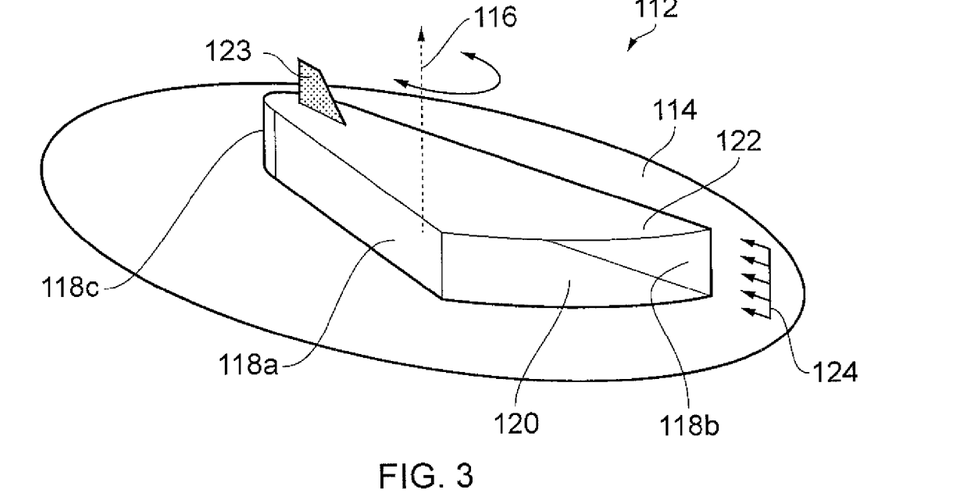
FIG. 3 shows a three-dimensional view of an intake according to the present invention.

Further details of a preferred embodiment of the intake formation 112 are shown in FIG. 3. The intake formation 112 comprises a base member 114 which is rotatably mounted in use to the nacelle 110. The base member is rotatable about axis 116, which, in this embodiment, is radially aligned with the primary axis 106, although this orientation could vary, for example to accommodate a different shape/orientation of the nacelle 110 in the vicinity of the intake 112. The axis 116 is offset from and independent of the longitudinal axes 102*a*, 104*a* shown in FIG. 2. The base member 114 may be in the form of a circular base plate or disc member or other suitable rotatable fixture capable of supporting the intake relative to the nacelle.

The base member 114 has a surface which is mounted substantially flush with outer surface of the nacelle 110.

Upstanding walls 118 define the shape of the intake, which is akin to a scoop. A pair of spaced side walls 118*a* and 118*b* define an opening or mouth 120 therebetween at a first end of the intake. The opposing end is closed by end wall 118*c* which spans the side walls 118*a* and 118*b*. An upper wall 122 (i.e. akin to a roof or ceiling) is transverse to the side walls 118*a* and 118*b* at the outermost edge thereof. The upper wall and side walls together define an upstanding partial enclosure depending from the base member 114 and having a mouth 120 at one end thereof.

The open-ended shape or partial enclosure of the intake formation provides a directional intake arrangement. A directional arrangement may be considered to comprise an arrangement which is open to fluid flow in a first direction but which inhibits fluid intake in a second or further directions. In this example the intake inhibits fluid intake in an opposing direction and also in orthogonal directions. The term "directions" in this context may be considered to comprise any of the positive or negative X, Y or Z directions in a co-ordinate system defined by the axis 116.

Figures 4A, 4B:
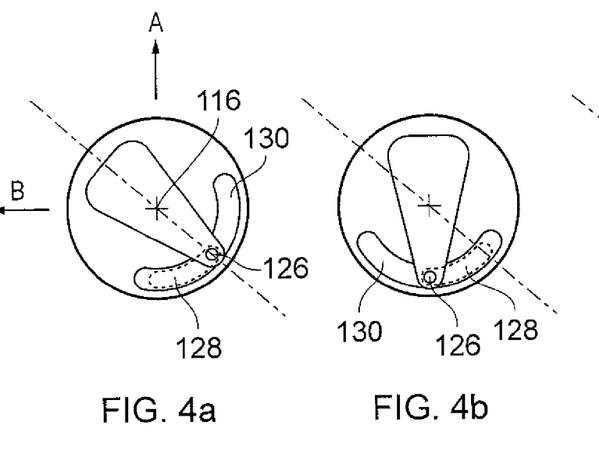
FIGS. 4a-c show plan views of an intake according to one example of the invention in different operating conditions.
Figure 4C:
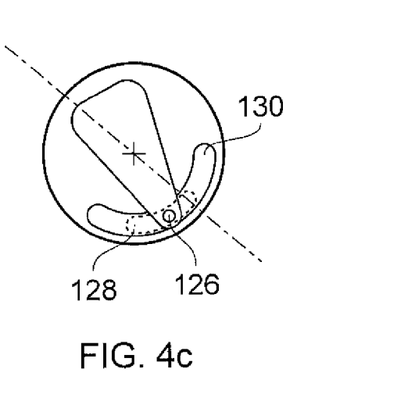

As can also be seen in FIGS. 3 and 4, the side walls 118*a* and 118*b* are non-parallel so as to define a tapered intake formation. Thus the intake formation widens towards its open end/mouth 120. The angle of taper may be between 5° and 45° and is typically less than 30°. In this example the angle of taper is approximately 20°.

The base member and walls 118, 122 define a body which is rotatable relative to the nacelle about axis 116 which is independent of the longitudinal axis. That is to say the base member and scoop rotate in unison. The periphery of the base member 114 forms a suitable rotating seal engagement with the opposing wall portion of the nacelle such that air is unable to pass therebetween at the desired operating pressures. In other embodiments, it will be appreciated that a base member 114 may not be required, for example if the scoop itself had a region which is generally circular in section such that can define a body of rotation which is sealable with the nacelle. Other adjustable, pressure-sealed interface arrangements may be provided to transfer the flow from the rotatable intake into the nacelle.

An alignment formation in the form of a fin 123 is provided behind the axis of rotation 116 in the direction of oncoming flow. Typically the fin 123 is located towards the rear/closed end of the intake 112 (i.e. such that it is spaced from the mouth 120 by the axis 116). Any other suitable upstanding wall or other formation could be provided in this regard. Additionally or alternatively, the desired alignment of the intake relative to the oncoming airflow could be achieved by the shape of the walls 118, 120 so as to provide a greater resistance to flow in orthogonal or reverse directions.

The direction of air approaching the intake/offtake 112 to be ingested is shown by arrows 124. The orientation of the intake in this embodiment preferably always faces the flow. However the desired orientation of the intake 112 can be achieved by other control means, for example using a sensor-and-controller arrangement which actuates the intake according to a control loop, such as an open or closed control loop.

FIGS. 4a-4c illustrate different positions of the intake 112. In FIG. 4a, the intake is oriented at an angle between the direction of rotation of the nacelle/propellers, indicated by arrow A, and the direction of travel of the aircraft/engine, indicated by arrow B. Such a scenario will typically be adopted during aircraft cruise conditions or else at relatively high, or maximum, rotational engine speed. In this case the relative velocity is thus a combination of axial forward movement and rotational speed.

In FIG. 4b there is illustrated a condition in which the intake opening faces the direction of rotation of the engine (i.e. about the primary engine axis 106). This condition may be adopted for example when the engine is stationary or moving at relatively low speed of travel.

In FIG. 4c there is shown an intermediate position in which the intake is part-way between the orientations of FIGS. 4a and 4b. In this regard it will be appreciated that the rotating intake arrangement is range-taking in that it can adopt a suitable orientation anywhere between the extremes of operation. Dependent on the type of actuator or control means for the intake, the maximum range of rotation of the intake may be 90°, such that it could vary between ram air intake conditions exclusively driven by forward motion or rotation respectively. However in the embodiment in which the intake rotates passively in response to relative airflow direction, the range of movement will typically be smaller, such as, for example, 40° or 45°.

Also shown in FIG. 4 is the outlet opening 126 of the intake, which leads into the nacelle in a substantially radial direction with respect to the primary axis of engine rotation (i.e. orthogonal to the nacelle outer surface or else aligned with axis 116). The intake outlet is typically located towards the closed end of the intake and leads to a duct which passes through the nacelle wall.

An opening 128 in the nacelle/casing to accommodate the flow through the intake is shown in phantom in FIG. 4. The opening may have ends which define the maximum angular range of movement of the intake. In this embodiment, the opening is elongate and curved in plan and passes through an angle of 45°. Thus the opening is non-rotating with respect to the axis 116. The opening 128 may be sealed by virtue of base plate 114 overlying the opening in use. Additionally or alternatively, the intake may be provided with sealing projections 130 extending either side of the opening 126. Those projections may follow the path of a circular arc so as to cover the nacelle opening 128 over the range of movement of the intake. Such sealing is intended to avoid pressure loss within the system.

Turning back to FIG. 2, in use, the above-described ram-air intake(s) drive ambient air inwards towards the outer gearbox outer wall 108 along an air guiding duct. The airflow is directed along the gearbox surface 108 for example using a suitable baffle-plate or ducting arrangement and thereby cools the surface.

The radially inner surface (with respect to axis 106) of the gearbox outer wall 108 is oil wetted in use. The oil is fed to the bearings and gear train within the gearbox to provide both lubricating and cooling functions prior to scavenging. The scavenged oil is passed to the inner side of gearbox wall 108, and, as a result of the wall being air cooled, the flow of oil is cooled by conduction through the wall.

Thus the average scavenge oil temperature can be lowered, which reduces the required cooling air. The heat transfer through the gear box wall can be improved through outer surface (gearbox) features for promoting heat exchange and/or by baffle arrangements to promote air turbulence. An arrangement of protrusions, fins or the like may be provided for this purpose. The provision of such structures on the gearbox surface will also beneficially increase the surface area available for heat transfer.

Location 132 denotes an interface or buffer (e.g. a gearbox sealing arrangement) between the adjacent bladed rotor (e.g. propeller) assemblies 102 and 104. Location 134 denotes the interface or buffer (e.g. a gearbox sealing arrangement) between the rear of the bladed rotor assembly 104 and the stationary aft structure 105 of the engine. The bladed rotors each rotate (either in a co or contra rotating manner) about primary axis 106.

The air passed to the gearbox may pass through the gearbox sealing arrangement at buffer 132 and/or 134. In this manner the air from the intake can be used to provide an additional or alternative sealing function to the cooling functions described above. Thus the pressurised air passing between the gearbox rotor/stator interfaces can serve to prevent leakage from the gearbox. In this manner, the air can be used for bearing chamber sealing of the gearbox or the gas generator.

In the embodiments shown, the air typically provides both a cooling and a sealing function such that the ambient air is first passed along the wall 108 or cooling purposes prior to exiting the gearbox via the buffers 132/134.

The air used for sealing purposes may escape to the exterior of the nacelles as shown by arrows 136 and 138. Typically an excess of air will be provided by the intake than is necessary for sealing purposes alone. The remaining air (or else the flow of air used for cooling functions) exiting the gearbox may escape through other ducting/routes, such as for example, partly via a vent system 140 and/or partly via a scavenge system 142.

Figure 5:
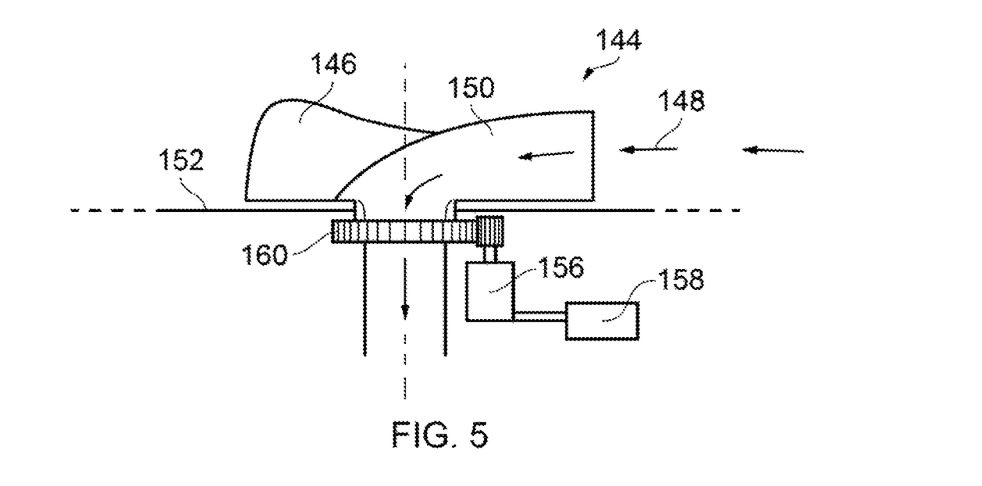
FIG. 5 shows a section view through an intake according to a further embodiment of the invention.

In FIG. 5, there is shown an alternative mechanism for adjusting rotation of an intake assembly 144 which is substantially as hereinbefore described, save that the fin 146 in this embodiment is optional and may be omitted. Also the shape of the housing particularly in respect of the side and rear walls may be modified such that the intake displays a more aerodynamic profile to flow in orthogonal directions to the flow 148 into the intake. The intake scoop 150 depends outwardly from the nacelle outer surface and feeds air to the nacelle interior via duct which passes through the nacelle wall 152. An actuator or driver, typically in the form of an electric motor 156, drives the rotation of the scoop in accordance with a desired orientation determined by a controller 158. The actuator may drive the scoop via a reduction gear arrangement 160.

In such an embodiment the orientation of the scoop is actively controlled by controller 158 according to a control strategy or algorithm. The controller may be a conventional engine controller or other dedicated control device and typically receives one or more sensor readings, from which a desired orientation of the intake can be determined and set by the controller. Accordingly the controller typically dynamically controls the intake orientation, substantially in real-time with reference to the sensed operational parameters. The sensed operational parameters may comprise the rotational speed of the engine rotor assembly 102;104 and/or the speed of the engine in the direction of forward motion (i.e. in order to determine relative air velocity). Additionally or alternatively, the sensed operational parameter may comprise the pressure or flow within the intake or else in one or more other portions of the cooling/sealing system.

The addition of a controller allows a closed-loop control scheme to be applied. In some embodiments, the controller may control the intake to face the direction of oncoming flow. Additionally or alternatively the controller may first prioritise the flow to the cooling/sealing system and may control the intake with a secondary aim of engine efficiency. Accordingly if the controller determines that the ram air due to the forward motion of the engine is sufficient to drive flow through the system alone, the controller may actuate the intake to face in the direction of travel so as to minimise unnecessary drag penalties experienced by the rotor.

Regardless of the method of actuation of the intake, the air flow from the intake can be transferred from the rotating nacelle to a static reference frame for example by allowing the air to flood an internal cavity within the nacelle. The transfer to the static structure can be arranged in the buffer cavity or a separate cavity with an additional seal (downstream of the buffer seal).

In certain embodiments, the air outlet duct can transfer the air to the static structure and perform the following:
  Exit into existing ejector duct
  Exit at nozzle exit into hot gas stream (for example the air could be transferred in a closed cavity (pipes) to the exit so that the nacelle venting is avoided
  Provided to cabin air
  Air Source for cooled cooling air of the air system
  Cool scavenge pipe work, especially from gearbox or other components The currently preferred option would be that the air is exited in an ejector, as this provides a higher pressure differential between inlet and exit and hence drives more flow through the system. However it is possible that other scenarios could be accommodated dependent on other system demands.

Figure 6:
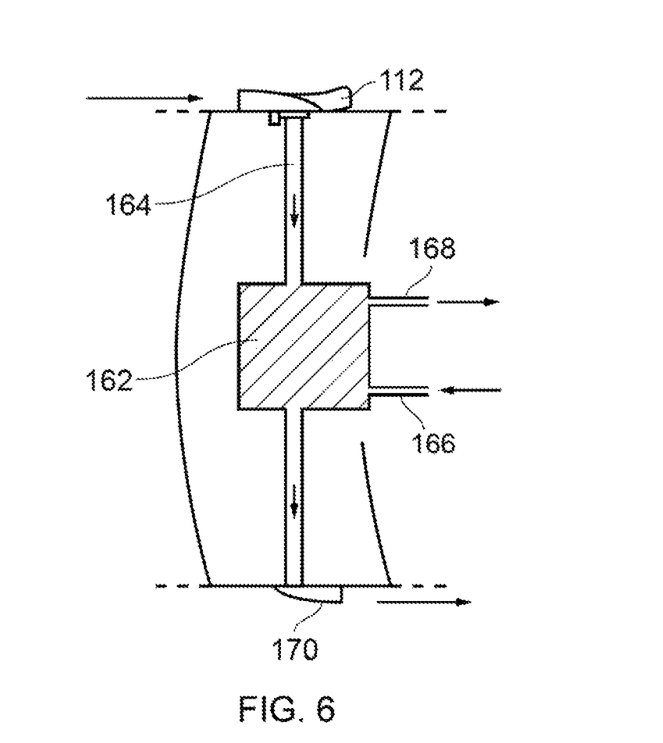
FIG. 6 shows a partial section view through a schematic of a rotor assembly cooling system according to a further embodiment of the invention.

Instead of flooding the interior of a nacelle cavity a potential design using pipes is shown in FIG. 6, in which the rotating intake 112 or 144 communicates with the air/oil heat exchanger 162 via dedicated ducting 164. The oil inlet and outlet for the heat exchanger are shown at 166 and 168 respectively. This arrangement can also transfer the air to a heat exchanger integrated into the rotating nacelle.

The air exiting the heat exchanger may be transferred to an exit arrangement 170, at the outer surface of nacelle in a location spaced from intake 112;144. The exit arrangement 170 or outlet could be arranged as a scoop facing rearwards (in the sense of nacelle rotation and/or direction of travel). By this, the static pressure is additionally reduced providing an additional suction pressure to the system increasing the flow there-through. The optimum is achieved when the directional outlet is orientated 180 degree relative to the inlet orientation.

Accordingly, in one aspect of the invention a directional outlet may also be rotatably mounted to the nacelle in a manner similar to the intake of a further aspect of the invention as defined above.

This invention may be applicable to other engines, pumps or turbine arrangements having a rotating casing which is open to ambient air and is not limited to cooling/sealing systems but may be applied to any configuration in which it is desirous to drive a flow of air into the interior of the casing.

The invention claimed is:

1. A fluid supply system for a rotary machine, the system comprising:
    a rotor assembly comprising an array of blades arranged to be driven about a primary axis to provide propulsive thrust in use, each blade having a longitudinal axis, the rotor assembly comprising a casing structure, wherein the casing structure is rotatable in unison with the blades about the primary axis;
    a directional fluid intake, said intake being rotatably mounted at an outer surface of the casing structure about a second axis which is angularly offset from the primary axis and which is offset from and independent of the longitudinal axis of the blade.

2. A fluid supply system according to claim 1, wherein the intake is arranged to direct fluid from the exterior of the casing structure to the interior thereof.

3. A fluid supply system according to claim 1, wherein the second axis is a substantially radial or orthogonal axis with respect to the primary axis.

4. A fluid supply system according to claim 1, wherein the second axis is substantially radially aligned with respect to the primary axis.

5. A fluid supply system according to claim 1, wherein the intake comprises a ram air intake for ambient air.

6. A fluid supply system according to claim 1, wherein the intake is rotatably adjustable in use to receive airflow in a direction such that a component of said airflow is due to rotation of the intake about the primary axis and a further component of said airflow is due to relative translation between the intake and the ambient air.

7. A fluid supply system according to claim 1, wherein the intake comprises adjustment means for ensuring an angular orientation of the intake about the second axis is such that the intake faces a direction of relative motion between the intake and ambient air.

8. A fluid supply system according to claim 1, wherein an orientation of the intake about the second axis is passively adjusted in response to a direction of relative movement between the intake and the ambient air.

9. A fluid supply system according to claim 8, wherein the intake comprises an upstanding fin.

10. A fluid supply system according to claim 1, wherein an orientation of the intake about the second axis is actively adjusted in response to one or more sensed operation al parameters.

11. A fluid supply system according to claim 10, comprising:
    a controller for receiving signals indicative of the one or more sensed operational parameters; and,
    an actuator for controlling rotation of the intake about the second axis,
    wherein the controller controls operation of the actuator in accordance with the received operational parameter signals.

12. A fluid supply system according to claim 11, wherein the controller determines a desired angular orientation of the intake according to a closed loop control scheme and/or the operational parameters comprise any, or any combination of: a rotational speed or frequency of the rotor assembly; a speed of movement of the rotary machine in a direction of travel; one or more fluid supply pressures within the system; and/or one or more component or fluid temperatures within the system.

13. A fluid supply system according to claim 1, wherein the outer surface of the casing structure comprises a fluid-washed surface and the intake comprises an upstanding structure depending from said surface.

14. A fluid supply system according to claim 1, wherein the intake comprises a scoop structure having an open mouth.

15. A fluid supply system according to claim 14, wherein the scoop tapers outwardly from a closed end thereof towards the mouth.

16. A fluid supply system according to claim 1, wherein the outer surface of the casing comprises an outwardly or inwardly facing circumferential surface, which is located about the primary axis.

17. A fluid supply system according to claim 1, wherein the fluid comprises a coolant and the fluid pressure within the intake drives coolant through the coolant system for oil and/or component cooling within the casing.

18. A fluid supply system according to claim 17, wherein the intake is for a gearbox coolant supply system.

19. A fluid supply system according to claim 1, wherein the rotary machine comprises a gas turbine engine.

20. A fluid supply system according to claim 1, wherein the rotary machine comprises an open-rotor gas turbine engine and the casing comprises a rotating nacelle portion.

* * * * *